United States Patent
Miyafuji

(10) Patent No.: US 9,328,272 B2
(45) Date of Patent: May 3, 2016

(54) CURABLE COMPOSITION

(71) Applicant: KANEKA CORPORATION, Osaka (JP)

(72) Inventor: Kiyoshi Miyafuji, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/426,836

(22) PCT Filed: Sep. 6, 2013

(86) PCT No.: PCT/JP2013/074034
§ 371 (c)(1),
(2) Date: Mar. 9, 2015

(87) PCT Pub. No.: WO2014/038656
PCT Pub. Date: Mar. 13, 2014

(65) Prior Publication Data
US 2015/0259581 A1 Sep. 17, 2015

(30) Foreign Application Priority Data
Sep. 10, 2012 (JP) .................................. 2012-198350

(51) Int. Cl.
*C09J 171/02* (2006.01)
*C08G 65/336* (2006.01)
*C09K 3/10* (2006.01)
*C08L 71/02* (2006.01)

(52) U.S. Cl.
CPC ............... *C09J 171/02* (2013.01); *C08L 71/02* (2013.01); *C09K 3/10* (2013.01); *C08G 65/336* (2013.01)

(58) Field of Classification Search
None
See application file for complete search history.

(56) References Cited

U.S. PATENT DOCUMENTS

| 8,614,269 B2 * | 12/2013 | Gahlmann | C08G 65/336 156/71 |
| 2004/0132950 A1 * | 7/2004 | Roesler | C08G 18/0885 528/28 |
| 2013/0274410 A1 | 10/2013 | Miyafuji et al. | |
| 2013/0281632 A1 | 10/2013 | Yano et al. | |

FOREIGN PATENT DOCUMENTS

| JP | 52-073998 A | 6/1977 |
| JP | 2003-147192 A | 5/2003 |
| JP | 2010-001492 A | 1/2010 |
| JP | 2010-150380 A | 7/2010 |
| WO | 2012/057092 A1 | 5/2012 |
| WO | 2012/070476 A1 | 5/2012 |

OTHER PUBLICATIONS

International Preliminary Report on Patentability (Form PCT/IB/373) of Application No. PCT/JP2013/074034 dated Mar. 10, 2015, with Form PCT/ISA/237 (English translation).
Machine translation of JP2010-150380, previously submitted on Mar. 9, 2015.
Machine translation of JP2010-001492, previously submitted on Mar. 9, 2015.
Machine translation of JP2003-147192, previously submitted on Mar. 9, 2015.

* cited by examiner

*Primary Examiner* — Marc Zimmer
(74) *Attorney, Agent, or Firm* — Westerman, Hattori, Daniels & Adrian, LLP

(57) ABSTRACT

The present invention aims to provide a curable composition that is usable in fast curing adhesives and the like and has excellent curability and excellent initial adhesion. The aim is accomplished by use of a curable composition that contains a polyoxyalkylene polymer (a1) having a reactive silyl group (e.g., trimethoxysilyl group) equivalent of 0.15 mmol/g to 1.5 mmol/g and a polyoxyalkylene polymer (a2) having a reactive silyl group equivalent of 0.010 to 0.14 mmol/g. Preferably, the polymers (a1) and (a2) both have a backbone with at least one branch.

13 Claims, No Drawings

CURABLE COMPOSITION

TECHNICAL FIELD

The present invention relates to an organic polymer containing a silicon-containing group that contains a hydroxy or hydrolyzable group bonded to a silicon atom and can be cross-linked by forming a siloxane bond (hereinafter, also referred to as "reactive silyl group"). The present invention also relates to a curable composition containing the organic polymer.

BACKGROUND ART

It is known that reactive silicon-containing organic polymers by nature are crosslinked by siloxane bond formation following the hydrolysis or other reactions of the silyl group caused by moisture or the like even at room temperature, and thus provide rubbery cured products.

Among such organic polymers, reactive silyl group-containing polyoxyalkylene polymers have a relatively low viscosity, and thus exhibit excellent workability when compositions containing them are prepared or used. In addition, since curable compositions containing them give cured products with a good balance of properties, including mechanical properties, weather resistance, and dynamic durability, they are widely used in sealants, adhesives, coating materials, and other applications (Patent Literature 1). Curable compositions that contain reactive silyl group-containing polyoxyalkylenes are required to have various properties, such as curability, cured mechanical properties, weather resistance, and adhesiveness, depending on the application. The properties of cured products of reactive silyl group-containing organic polymers can be controlled by adjusting the type and amount of reactive silyl group. For example, dimethoxymethylsilyl group-containing organic polymers have a mild curability and show excellent elongation properties, and thus they are used in various applications. It is known that trimethoxysilyl group-containing organic polymers have excellent curability and are likely to provide cured products having high hardness (Patent Literature 2). Thus, varying the type of reactive silyl group allows the organic polymers to provide properties depending on the application.

Fast curing adhesives are especially required to have rapid curability. It is important for such adhesives to early exhibit adhesive strength as well as surface curability.

CITATION LIST

Patent Literature

Patent Literature 1: JP-A S52-73998
Patent Literature 2: JP-A 2003-147192

SUMMARY OF INVENTION

Technical Problem

If a reactive silyl group-containing polyoxyalkylene is used as the base polymer for fast curing adhesives, a polyoxyalkylene containing a highly reactive trimethoxysilyl group may be used. In this case, however, an enough amount of curing catalyst, such as organotin catalyst, is required for enough curability and enough initial adhesive strength.

An object of the present invention is to provide a curable composition that is useful especially in fast curing adhesive applications and excellent in surface curing rate and initial adhesive strength.

Solution to Problem

The present inventors have made intensive studies to solve the above problems, and have found that the above problems can be solved by use of a curable composition that contains a polyoxyalkylene polymer (a1) having a reactive silyl group (e.g., trimethoxysilyl group) equivalent of 0.15 mmol/g to 1.5 mmol/g, and a polyoxyalkylene polymer (a2) having a reactive silyl group equivalent of 0.010 to 0.14 mmol/g. Thus, the inventors have completed the present invention.

Accordingly, the present invention relates to the following items (1) to (12):
(1). a curable composition, comprising a polyoxyalkylene polymer (A) containing a reactive silyl group represented by Formula (1):

$$—SiR^1_a X_{3-a} \qquad (1)$$

wherein $R^1$ represents a substituted or unsubstituted C1 to C20 hydrocarbon group; X represents a hydroxy group or a hydrolyzable group; a represents 0 or 1; and $R^1$s or Xs may be the same as or different from each other, the polyoxyalkylene polymer (A) comprising a polyoxyalkylene polymer (a1) having a reactive silyl group equivalent of 0.15 mmol/g to 1.5 mmol/g, and a polyoxyalkylene polymer (a2) having a reactive silyl group equivalent of 0.010 to 0.14 mmol/g;
(2). the curable composition according to the item (1), wherein the reactive silyl group of Formula (1) is a trimethoxysilyl group;
(3). the curable composition according to the item (1) or (2), wherein the polymer (a1) and the polymer (a2) contain the same reactive silyl group;
(4). the curable composition according to any one of the items (1) to (3), wherein the polymer (a1) has a reactive silyl group equivalent of 0.20 mmol/g to 1.0 mmol/g;
(5). the curable composition according to any one of the items (1) to (4), wherein the polymer (a2) has a reactive silyl group equivalent of 0.050 mmol/g to 0.14 mmol/g;
(6). the curable composition according to any one of the items (1) to (5), wherein the polymer (a1) has a backbone with at least one branch;
(7). the curable composition according to any one of the items (1) to (6), wherein the polymer (a2) has a backbone with at least one branch;
(8). the curable composition according to any one of the items (1) to (7), wherein the polymer (a1) has 1.6 or more reactive silyl groups of Formula (1) on average;
(9). the curable composition according to any one of the items (1) to (8), wherein the polymer (a1) and the polymer (a2) are mixed at a ratio of (a1):(a2)=95:5 to 50:50 in parts by weight;
(10). an adhesive, comprising the curable composition according to any one of items (1) to (9);
(11). a sealant, comprising the curable composition according to any one of the items (1) to (9); and
(12). a cured product, obtained by curing the curable composition according to any one of the items (1) to (9).

Advantageous Effects of Invention

The curable composition of the present invention, which contains the polymers (a1) and (a2) each having a specific number of reactive silyl groups, achieves rapid surface curing and has excellent initial adhesion even though a curing catalyst is used in a small amount.

DESCRIPTION OF EMBODIMENTS

The present invention is described in detail below.

The reactive silyl group-containing polyoxyalkylene polymer (A) in the present invention contains a reactive silyl group represented by the following Formula (1):

$$-SiR^1{}_aX_{3-a} \qquad (1)$$

wherein $R^1$ represents a substituted or unsubstituted C1 to C20 hydrocarbon group in which hydrogen atoms on the carbon atoms at positions 1 to 3 may each be replaced with a hetero atom; X represents a hydroxy group or a hydrolyzable group; a represents 0 or 1; and $R^1$s or Xs may be the same as or different from each other.

Specific examples of $R^1$ in Formula (1) include alkyl groups such as methyl and ethyl groups; cycloalkyl groups such as a cyclohexyl group; aryl groups such as a phenyl group; aralkyl groups such as a benzyl group, and triorganosiloxy groups represented by $-OSi(R')_3$ where R' is such a group as a methyl group or a phenyl group; fluoroalkyl groups such as fluoromethyl and difluoromethyl groups; chloroalkyl groups such as chloromethyl and 1-chloroethyl groups; alkoxyalkyl groups such as methoxymethyl, ethoxymethyl, phenoxymethyl, and 1-methoxyethyl groups; aminoalkyl groups such as aminomethyl, N-methylaminomethyl, and N,N-dimethylaminomethyl groups; an acetoxymethyl group, a methylcarbamate group, and a 2-cyanoethyl group. Among these groups, methyl, chloromethyl, and methoxymethyl groups are more preferred in view of availability of starting materials.

The hydrolyzable group represented as X in Formula (1) may be a known hydrolyzable group. Specific examples include hydrogen, halogens, alkoxy groups, alkenyloxy groups, aryloxy groups, acyloxy groups, ketoxymate groups, amino groups, amide groups, acid amide groups, aminooxy groups, and mercapto groups. Among these groups, halogens, alkoxy groups, alkenyloxy groups, and acyloxy groups, which have high activity, are preferred. Alkoxy groups such as methoxy and ethoxy groups, which have mild hydrolyzability and are easy to handle, are more preferred, with methoxy and ethoxy groups being particularly preferred. Also, ethoxy and isopropenoxy groups, which release ethanol and acetone, respectively, in the reaction, are preferred for safety reasons.

Specific preferred examples of the reactive silyl group represented by Formula (1) include trimethoxysilyl, triethoxysilyl, tris(2-propenyloxy)silyl, triacetoxysilyl, dimethoxymethylsilyl, diethoxymethylsilyl, diisopropoxymethylsilyl, (chloromethyl)dimethoxysilyl, (methoxymethyl)dimethoxysilyl, (methoxymethyl)diethoxysilyl, and (ethoxymethyl)dimethoxysilyl groups. Among these groups, trimethoxysilyl, (chloromethyl)dimethoxysilyl, and (methoxymethyl)dimethoxysilyl groups are preferred because they have high activity and allow the resulting cured product to have good mechanical properties. From the standpoint of activity, trimethoxysilyl and (methoxymethyl)dimethoxysilyl groups are more preferred, with a trimethoxysilyl group being most preferred. Dimethoxymethylsilyl and triethoxysilyl groups are preferred because they have mild curability and are easy to handle. The polymer (a1) and the polymer (a2) may contain the same or different reactive silyl groups. To achieve rapid curing, the polymers (a1) and (a2) preferably contain the same reactive silyl group.

The polyoxyalkylene polymer (A) has a relatively low glass transition temperature and enables the resultant cured product to have excellent cold resistance. Additionally, the polyoxyalkylene polymer (A) is characterized by high moisture permeability, and excellent depth curability when it is used in one-pack compositions, as well as excellent adhesion.

Specific examples include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers.

The backbone of the polyoxyalkylene polymer may have only one type of repeating unit or may have two or more types of repeating units. The polyoxyalkylene polymer, particularly when used in sealants, adhesives or the like, preferably includes a polyoxypropylene polymer whose backbone contains 50% by weight or more, preferably 80% by weight or more of oxypropylene repeating units because such a polymer is amorphous and has a relatively low viscosity.

The backbone of the polymer (A) may contain a polymeric structure other than the oxyalkylene structure as long as it does not impair the effects of the invention.

The backbone of the polymer (A) may be linear or branched. The polymer (A) preferably has the reactive silyl group at a chain end to increase the reactive silyl group content, and preferably has a branched structure, because then rapid curing can be easily achieved, and the resultant cured product can have high hardness. If the polymer (A) has a branched structure, the number of branches is preferably 1 to 4, and most preferably 1.

The polyoxyalkylene polymer is preferably obtained by ring opening polymerization of a cyclic ether compound using a polymerization catalyst in the presence of an initiator.

Examples of the cyclic ether compound include ethylene oxide, propylene oxide, butylene oxide, tetramethylene oxide, and tetrahydrofuran. These cyclic ether compounds may be used singly or in combination of two or more. Among these cyclic ether compounds, propylene oxide is particularly preferred because it can form a polyether polymer that is amorphous and has a relatively low viscosity.

Specific examples of the initiator include alcohols such as ethylene glycol, propylene glycol, butanediol, hexamethylene glycol, neopentyl glycol, diethylene glycol, dipropylene glycol, triethylene glycol, glycerin, trimethylolmethane, trimethylolpropane, pentaerythritol, and sorbitol; and polyoxyalkylene polymers having a number average molecular weight of 300 to 4,000, such as polyoxypropylene diol, polyoxypropylene triol, polyoxyethylene diol, and polyoxyethylene triol.

The polyoxyalkylene polymer may be synthesized by, for example, but not limited to: a polymerization method using an alkali catalyst such as KOH; a polymerization method using a transition metal compound-porphyrin complex catalyst such as a complex obtained by the reaction between an organoaluminum compound and a porphyrin, as disclosed in JP-A S61-215623; a polymerization method using a double metal cyanide complex catalyst, as disclosed in, for example, JP-B S46-27250, JP-B S59-15336, and U.S. Pat. Nos. 3,278,457, 3,278,458, 3,278,459, 3,427,256, 3,427,334, and 3,427,335; a polymerization method using a catalyst containing a polyphosphazene salt, as described in JP-A H10-273512; and a polymerization method using a catalyst containing a phosphazene compound, as described in JP-A H11-060722. More preferred is the polymerization method using a double metal cyanide complex catalyst because of production costs and because it provides polymers having a narrow molecular weight distribution.

Although not particularly limited, the molecular weight distribution (Mw/Mn) of the polymer (A) is preferably narrow. It is preferably smaller than 2.0, more preferably 1.6 or smaller, still more preferably 1.5 or smaller, and particularly preferably 1.4 or smaller.

It has been found in the present invention that combined use of a polyoxyalkylene polymer (a1) having a reactive silyl group equivalent of 0.15 mmol/g to 1.5 mmol/g and a polyoxyalkylene polymer (a2) having a reactive silyl group equivalent of 0.010 to 0.14 mmol/g results in a curable composition having excellent curability. A curable composition containing the polymer (a1) alone shows good curability when a curing catalyst is used in an amount equal to or greater than a predetermined amount. However, such a curable composition has a high reactive silyl group content and therefore tends to give a fragile cured product. A curable composition containing the polymer (a2) alone gives a cured product that exhibits excellent elongation properties, but has poor curability in some cases. If the polymer (a1) and the polymer (a2) are used in combination to solve these problems, advantageously, better curability is achieved than when they are used alone, and elongation properties are less impaired than when the polymer (a1) alone is used. These effects cannot be expected from conventional knowledge and are clearly greater effects.

It is preferred that the polymer (a1) and the polymer (a2) contain the same reactive silyl group because, in such a case, rapid curing can be easily achieved. Particularly preferably, the polymers (a1) and (a2) have a trimethoxysilyl group.

The polymer (a1) preferably has a number average molecular weight of 1,300 to 27,000, more preferably 1,500 to 23,000, and particularly preferably 2,000 to 20,000. If the polymer (a1) has a small number average molecular weight, the curable composition has a low viscosity and thus can be used with better workability, whereas the resulting cured product tends to become hard and have reduced elongation properties. If the molecular weight is too large, the reactive silyl group concentration may become too low, resulting in a reduced curing rate. Additionally, in this case, the curable composition tends to have an excessively high viscosity and to be difficult to handle.

The polymer (a2) preferably has a number average molecular weight of 7,000 to 100,000, more preferably 7,000 to 70,000, and particularly preferably 7,000 to 40,000. If the polyoxyalkylene polymer (a2) has a small number average molecular weight, the curable composition has a low viscosity and thus can be used with better workability, whereas the resulting cured product tends to become hard and have reduced elongation properties. If the molecular weight is too large, the reactive silyl group concentration may become too low, resulting in a reduced curing rate. Additionally, in this case, the curable composition tends to have an excessively high viscosity and to be difficult to handle.

The number average molecular weight of the polymer (A) is defined as the molecular weight (end group-based molecular weight) corresponding to the number average molecular weight determined by directly measuring the end group concentration by titrimetric analysis based on the principles of the method of measuring hydroxyl value according to JIS K 1557 and the method of measuring iodine value according to JIS K 0070, and taking into account the structure (the degree of branching that depends on the polymerization initiator used) of the organic polymer.

The reactive silyl group can be introduced by any known method. Exemplary introduction methods are shown below.

(i) Hydrosilylation: This method includes introducing an unsaturated bond into a starting material polymer (hereinafter, also referred to as "precursor polymer") and then adding a hydrosilane compound to the unsaturated bond by hydrosilylation. The unsaturated bond can be introduced by any method, such as by reacting a precursor polymer containing such a functional group as a hydroxy group with a compound containing a group reactive with the functional group and an unsaturated group to produce an unsaturated group-containing polymer, or by copolymerization with an unsaturated bond-containing polymerizable monomer.

(ii) Reaction of a reactive group-containing polymer (precursor polymer) with a silane coupling agent: This method includes reacting a precursor polymer containing a reactive group such as a hydroxy group, an amino group, or an unsaturated bond with a compound containing both a group that can react with the reactive group to form a bond and a reactive silyl group (such a compound is also called "silane coupling agent"). Combinations of the reactive group of the precursor polymer and the reactive group of the silane coupling agent include, but not limited to, a combination of a hydroxy group and an isocyanato group; a combination of a hydroxy group and an epoxy group; a combination of an amino group and an isocyanato group; a combination of an amino group and a thioisocyanato group; a combination of an amino group and an epoxy group; Michael addition of an amino group to an acrylic structure; a combination of a carboxylic acid group and an epoxy group; and a combination of an unsaturated bond and a mercapto group.

The method (i) is preferred because it includes simple reactions, allows stable control of the amount of reactive silyl groups introduced, and produces a reactive silyl group-containing polymer having stable properties. The method (ii) is preferred because it includes many alternative reactions and can easily increase the introduction rate of the reactive silyl group.

Some examples of the hydrosilane compound used in the method (i) are described as follows: halogenated silanes such as trichlorosilane, dichloromethylsilane, dichlorophenylsilane, and (methoxymethyl)dichlorosilane; alkoxysilanes such as dimethoxymethylsilane, diethoxymethylsilane, trimethoxysilane, triethoxysilane, (chloromethyl)dimethoxysilane, and (methoxymethyl)dimethoxysilane; and isopropenyloxysilanes (deacetonation type) such as triisopropenyloxysilane, (chloromethyl)diisopropenyloxysilane, and (methoxymethyl)diisopropenyloxysilane.

Examples of silane coupling agents that can be used in the method (ii) include the following compounds: mercaptosilanes that can react with an unsaturated bond, such as 3-mercaptopropyltrimethoxysilane, 3-mercaptopropyldimethoxymethylsilane, 3-mercaptopropyltriethoxysilane, mercaptomethyltriethoxysilane, and mercaptomethyldimethoxymethylsilane; isocyanatosilanes that can react with a hydroxy group, such as 3-isocyanatopropyltrimethoxysilane, 3-isocyanatopropyldimethoxymethylsilane, 3-isocyanatopropyltriethoxysilane, isocyanatomethyltrimethoxysilane, isocyanatomethyltriethoxysilane, and isocyanatomethyldimethoxymethylsilane; epoxysilanes that can react with hydroxy, amino, and carboxylic acid groups, such as 3-glycidoxypropyltrimethoxysilane, 3-glycidoxypropyldimethoxymethylsilane, 3-glycidoxypropyltriethoxysilane, glycidoxymethyltrimethoxysilane, glycidoxymethyltriethoxysilane, and glycidoxymethyldimethoxymethylsilane; aminosilanes that can react with isocyanato and thioisocyanato groups, such as 3-aminopropyltrimethoxysilane, 3-aminopropyldimethoxymethylsilane, 3-aminopropyltriethoxysilane, 3-(2-aminoethyl)propyltrimethoxysilane, 3-(2-aminoethyl)propyldimethoxymethylsilane, 3-(2-aminoethyl)propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and bis(3-(trimethoxysilyl)propyl)amine; and hydroxyalkylsilanes such as 3-hydroxypropyltrimethoxysilane and hydroxymethyltriethoxysilane. These silane coupling agents are merely some examples, and a silyl group can be introduced by using or applying similar reactions.

The backbone of the polymer (A) may contain other components such as a urethane bond component to the extent that the effects of the present invention are not greatly impaired. The urethane bond component may be, but is not limited to, a group formed by the reaction of an isocyanato group with an active hydrogen group (hereinafter, also referred to as "amide segment").

Cured products obtained by curing curable compositions containing a polymer that has a urethane or ester bond in the backbone may provide high hardness, improved strength or other effects by the action of hydrogen bond or the like. The urethane bond, however, may be cleaved by heat or the like. In order to impart such properties to the curable composition of the present invention, an amide segment may be introduced into or intentionally eliminated from the polymer. The polyoxyalkylene polymer (A) containing an amide segment tends to have an increased viscosity. Additionally, the polyoxyalkylene polymer containing an amide segment may have improved curability.

The amide segment is a group represented by Formula (2):

$$-NR^2-C(=O)- \quad (2)$$

wherein $R^2$ represents an organic group or a hydrogen atom.

Specific examples of the amide segment include a urethane group formed by the reaction of an isocyanato group with a hydroxy group or the reaction of an amino group with a carbonate; a urea group formed by the reaction of an isocyanato group with an amino group; and a thiourethane group formed by the reaction of an isocyanato group with a mercapto group. In the present invention, the groups of Formula (2) include groups formed by further reaction of the active hydrogen in the urethane, urea, or thiourethane group with an isocyanato group.

The polyoxyalkylene polymer containing an amide segment and a reactive silyl group may be produced by an industrially convenient method that includes reacting a polyoxyalkylene polymer terminated with an active hydrogen-containing group with an excessive amount of a polyisocyanate compound to give a polymer having an isocyanato group at an end of the polyurethane backbone, and subsequently or simultaneously reacting all or a part of the isocyanato groups with the group Z of a silicon compound represented by Formula (3):

$$Z-R^3-SiR^1_aX_{3-a} \quad (3)$$

wherein $R^1$, X, and a are defined as mentioned above; $R^3$ is a divalent organic group, more preferably a C1 to C20 hydrocarbon group; and Z is an active hydrogen-containing group selected from hydroxy, carboxy, mercapto, and (primary or secondary) amino groups.

The polymer may also be produced by reacting a polyoxyalkylene polymer terminated with an active hydrogen-containing group with a reactive silyl group-containing isocyanate compound represented by Formula (4):

$$O=C=N-R^3-SiR^1_aX_{3-a} \quad (4)$$

wherein $R^3$, $R^1$, X, and a are defined as mentioned above.

Specific examples of the silicon compound represented by Formula (3) include, but are not limited to, amino group-containing silanes such as γ-aminopropyldimethoxymethylsilane, γ-aminopropyltrimethoxysilane, N-(β-aminoethyl)-γ-aminopropyltrimethoxysilane, N-(β-aminoethyl)-γ-aminopropyldimethoxymethylsilane, (N-phenyl)-γ-aminopropyltrimethoxysilane, and N-ethylaminoisobutyltrimethoxysilane; hydroxy group-containing silanes such as γ-hydroxypropyltrimethoxysilane; and mercapto group-containing silanes such as γ-mercaptopropyltrimethoxysilane and mercaptomethyltriethoxysilane. Also usable as the silicon compound of Formula (3) are Michael addition products of α,β-unsaturated carbonyl compounds and primary amino group-containing silanes and Michael addition products of (meth)acryloyl group-containing silanes and primary amino group-containing compounds, as disclosed in JP-A H06-211879 (U.S. Pat. No. 5,364,955), JP-A H10-53637 (U.S. Pat. No. 5,756,751), JP-A H10-204144 (EP 0831108), JP-A 2000-169544, and JP-A 2000-169545.

Specific examples of the reactive silyl group-containing isocyanate compound represented by Formula (4) include, but are not limited to, γ-trimethoxysilylpropyl isocyanate, γ-triethoxysilylpropyl isocyanate, γ-methyldimethoxysilylpropyl isocyanate, γ-methyldiethoxysilylpropyl isocyanate, γ-(methoxymethyl)dimethoxysilylpropyl isocyanate, trimethoxysilylmethyl isocyanate, triethoxymethylsilylmethyl isocyanate, dimethoxymethylsilylmethyl isocyanate, diethoxymethylsilylmethyl isocyanate, and (methoxymethyl)dimethoxysilylmethyl isocyanate.

The polymer (a1) and the polymer (a2) may be mixed by a method in which the polymers (a1) and (a2) are separately subjected to introduction of reactive silicon, and then both are mixed, or by a method in which precursor polymers of the polymers (a1) and (a2) are previously mixed, and then a reactive silyl group is introduced into them by the above methods.

If the backbone of the polymer (A) contains an amide segment, the average number of amide segments per molecule is preferably 1 to 10, more preferably 1.5 to 5, and particularly preferably 2 to 3. If the average number is less than 1, curability may be insufficient. If the average number is more than 10, the polymer may have a high viscosity and be difficult to handle.

In order to reduce the viscosity of the curable composition or to improve workability, the polymer (A) is preferably substantially free of amide segments.

In order to provide rapid curability to the composition, the polymer (a1) preferably has a reactive silyl group equivalent of 0.15 to 1.5 mmol/g, more preferably 0.17 to 1.3 mmol/g, and particularly preferably 0.20 to 1.0 mmol/g.

Moreover, the average number of reactive silyl groups per molecule of the polymer (a1) is preferably 1.6 to 4.2, more preferably 1.9 to 3.9, and particularly preferably 2.0 to 3.4.

The polymer (a2) preferably has a reactive silyl group equivalent of 0.010 to 0.14 mmol/g, more preferably 0.030 to 0.14 mmol/g, and particularly preferably 0.050 to 0.14 mmol/g.

Moreover, the average number of reactive silyl groups per molecule of the polymer (a2) is preferably 1.0 to 3.5, more preferably 1.1 to 3.0, and particularly preferably 1.2 to 2.8.

The reactive silyl group may be present at a chain end or a side chain end of the polymer, or at both ends. In particular, the reactive silyl group is preferably present at a chain end because, in such a case, the molecular weight between crosslinking points is large and a rubbery cured product having high strength and high elongation is more likely to be obtained.

The polymer (a1) and the polymer (a2) are preferably mixed at a ratio of (a1):(a2)=95:5 to 50:50 (parts by weight), more preferably (a1):(a2)=90:10 to 60:40 (parts by weight), and particularly preferably (a1):(a2)=85:15 to 70:30 (parts by weight).

In the present invention, a curing catalyst is used to cure the polymer (A) components. Specific examples of the curing catalyst include titanium compounds such as tetrabutyl titanate, tetrapropyl titanate, titanium tetrakis(acetylacetonate), diisopropoxytitanium bis(acetylacetonate), and diisopropoxytitanium bis(ethylacetoacetate); tetravalent organotin compounds such as dimethyltin diacetate, dimethyltin bis(acetylacetonate), dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(triethoxysilicate), dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), reaction products of dibutyltin oxide and silicate compounds, reaction products of dibutyltin oxide and phthalic acid esters, dioctyltin dilaurate, dioctyltin diacetate, and dioctyltin bis(acetylacetonate); organoaluminum compounds such as aluminum tris(acetylacetonate), aluminum tris(ethylacetoacetate), and diisopropoxyaluminum ethyl acetoacetate; and zirconium compounds such as zirconium tetrakis(acetylacetonate). Carboxylic acids and/or metal salts of carboxylic acids may also be used as the curing catalyst. Moreover, amidine compounds as disclosed in WO 2008/078654 may also be used. Examples of the amidine compounds include, but are not limited to, 1-(o-tolyl)biguanide, 1-phenylguanidine, 1,2-dimethyl-1,4,5,6-tetrahydropyrimidine, 1,5,7-triazabicyclo[4.4.0]dec-5-ene, and 7-methyl-1,5,7-triazabicyclo[4.4.0]dec-5-ene.

Among these catalysts, dibutyltin compounds and dioctyltin compounds are preferred because then rapid curing can be easily achieved. Dioctyltin compounds, which have low toxicity, are more preferred. Among these, dioctyltin bis(triethoxysilicate) is particularly preferred because it has high activity.

The amount of the condensation catalyst is preferably about 0.01 to 10 parts by weight, and more preferably 0.1 to 5 parts by weight for each 100 parts by weight of the polymer (A). If a tin compound is used, the amount of the tin compound is preferably less than 1 part by weight as there has been a trend towards limiting the usage of tin compounds due to the recent growing awareness of environmental problems.

The curable composition of the present invention may contain a plasticizer. The addition of a plasticizer enables control of the viscosity and slump properties of the curable composition and the mechanical properties such as hardness, tensile strength, and elongation of the cured product obtained by curing the curable composition. Specific examples of the plasticizer include phthalate compounds such as dibutyl phthalate, diisononyl phthalate (DINP), diheptyl phthalate, di(2-ethylhexyl) phthalate, diisodecyl phthalate (DIDP), and butyl benzyl phthalate; terephthalate compounds such as bis(2-ethylhexyl)-1,4-benzene dicarboxylate (specifically, a product available under the trade name Eastman 168 from Eastman Chemical Company); non-phthalate compounds such as 1,2-cyclohexane dicarboxylic acid diisononyl ester (specifically, a product available from under the trade name Hexamoll DINCH from BASF); aliphatic polycarboxylate compounds such as dioctyl adipate, dioctyl sebacate, dibutyl sebacate, diisodecyl succinate, and acetyl tributyl citrate; unsaturated fatty acid ester compounds such as butyl oleate and methyl acetyl ricinoleate; alkyl sulfonic acid phenyl esters (specifically, a product available under the trade name Mesamoll from Lanxess); phosphate compounds such as tricresyl phosphate and tributyl phosphate; trimellitate compounds; chlorinated paraffins; hydrocarbon oils such as alkyl diphenyls and partially hydrogenated terphenyls; process oil; and epoxy plasticizers such as epoxidized soybean oil and benzyl epoxystearate.

Also, polymer plasticizers may be used. If a polymer plasticizer is used, the initial properties can be maintained for a long period of time as compared with when a low molecular weight plasticizer is used. In addition, the polymer plasticizer can improve the drying properties (or coating properties) of an alkyd coating material applied to the cured product. Specific examples of the polymer plasticizer include, but are not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers prepared from dibasic acids (e.g. sebacic acid, adipic acid, azelaic acid, phthalic acid) and divalent alcohols (e.g. ethylene glycol, diethylene glycol, triethylene glycol, propylene glycol, dipropylene glycol); polyethers such as polyether polyols having a number average molecular weight of 500 or higher, or even of 1,000 or higher (e.g., polyethylene glycol, polypropylene glycol, polytetramethylene glycol), and their derivatives obtained by converting the hydroxy groups of these polyether polyols into ester groups, ether groups or other groups; polystyrenes such as polystyrene and poly-$\alpha$-methylstyrene; polybutadiene, polybutene, polyisobutylene, polybutadiene-acrylonitrile, and polychloroprene.

Among these polymer plasticizers, ones compatible with the polymer (A) are preferred. In view of this, polyether polymers and vinyl polymers are preferred. Moreover, polyether polymers are preferred plasticizers because they improve surface curability and depth curability and do not allow curing retardation to occur after storage. Among these, polypropylene glycol is more preferred. From the standpoints of compatibility, weather resistance, and heat resistance, vinyl polymers are preferred. Among vinyl polymers, acrylate polymers such as poly(alkyl (meth)acrylates) are particularly preferred. These polymers are preferably synthesized by living radical polymerization, more preferably atom transfer radical polymerization, which allow the resultant polymers to have a narrow molecular weight distribution and a low viscosity. Also preferred are polymers produced by the so-called SGO process in which alkyl (meth)acrylate monomers are continuously bulk polymerized under high temperature and high pressure conditions, as disclosed in JP-A 2001-207157.

The number average molecular weight of the polymer plasticizer is preferably 500 to 15,000, more preferably 800 to 10,000, still more preferably 1,000 to 8,000, particularly preferably 1,000 to 5,000, and most preferably 1,000 to 3,000. If the molecular weight is too low, the plasticizer bleeds out over time due to heat or rain, and therefore the initial properties cannot be maintained for a long period of time. Also, if the molecular weight is too high, viscosity is increased, resulting in poor workability.

Although not particularly limited, the molecular weight distribution of the polymer plasticizer is preferably narrow. The molecular weight distribution is preferably less than 1.80, more preferably 1.70 or less, still more preferably 1.60 or less, even more preferably 1.50 or less, particularly preferably 1.40 or less, and most preferably 1.30 or less.

The number average molecular weight of the polymer plasticizer is measured by GPC analysis in the case of vinyl polymers and by end group analysis in the case of polyether polymers. Also, the molecular weight distribution (Mw/Mn) is measured by GPC analysis (polystyrene basis).

The polymer plasticizer may also contain a reactive silyl group. If the polymer plasticizer contains a reactive silyl group, it functions as a reactive plasticizer, so that transfer of the plasticizer from the cured product can be prevented. If the polymer plasticizer contains a reactive silyl group, the average number of reactive silyl groups per molecule is preferably 1 or less, and more preferably 0.8 or less. If a reactive silyl group-containing plasticizer, particularly a reactive silyl group-containing polyether polymer, is used, the number average molecular weight thereof needs to be lower than that of the polyoxyalkylene polymer (a2).

The amount of the plasticizer is preferably 5 to 150 parts by weight, more preferably 10 to 120 parts by weight, and particularly preferably 20 to 100 parts by weight for each 100 parts by weight of the polymer (A). If the amount is less than 5 parts by weight, the plasticizer effects cannot be produced. If the amount is more than 150 parts by weight, the mechanical strength of the cured product is insufficient. The plasticizers may be used singly or in combination of two or more. Moreover, combinations of low molecular weight plasticizers with polymer plasticizers may be used. The plasticizer may also be added in polymer production.

The composition of the present invention may contain a solvent or a diluent. Examples of solvents and diluents include, but are not limited to, aliphatic hydrocarbons, aromatic hydrocarbons, alicyclic hydrocarbons, halogenated hydrocarbons, alcohols, esters, ketones, and ethers. If the solvent or diluent is used, in view of the problem of air pollution that can occur when the composition is used indoors, the solvent preferably has a boiling point of 150° C. or higher, more preferably 200° C. or higher, and particularly preferably 250° C. or higher. The solvents or diluents may be used singly or in combination of two or more.

The curable composition of the present invention may contain a silane coupling agent, a reaction product of a silane coupling agent, or a compound other than silane coupling agents, as an adhesion promoter.

Specific examples of the silane coupling agent include isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, α-isocyanatomethyltrimethoxysilane, and α-isocyanatomethyldimethoxymethylsilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, (aminomethyl)dimethoxymethylsilane, (aminomethyl)trimethoxysilane, (phenylaminomethyl)dimethoxymethylsilane, (phenylaminomethyl)trimethoxysilane, and bis(3-trimethoxysilylpropyl)amine; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimetoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenyl bis (β-methoxyethoxy)silane, and N-β-(carboxymethyl)aminoethyl-γ-aminopropyltrimethoxysilane; vinylically unsaturated group-containing silanes such as vinyltrimethoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; isocyanuratosilanes such as tris (trimethoxysilyl)isocyanurate; carbamatosilanes such as methyl (N-dimethoxymethylsilylmethyl)carbamate, methyl (N-trimethoxysilylmethyl)carbamate, methyl (N-dimethoxymethylsilylpropyl)carbamate, and methyl (N-trimethoxysilylpropyl)carbamate; alkoxy group-containing silanes such as (methoxymethyl)dimethoxymethylsilane, (methoxymethyl)trimethoxysilane, (ethoxymethyl)trimethoxysilane, and (phenoxymethyl)trimethoxysilane; and acid anhydride-containing silanes such as 3-(trimethoxysilyl) propylsuccinic anhydride and 3-(triethoxysilyl)propylsuccinic anhydride. Also usable as the silane coupling agent are partial condensates of these compounds and derivatives obtained by modifying these compounds, such as amino-modified silyl polymers, silylated amino polymers, unsaturated aminosilane complexes, phenylamino long-chain alkyl silanes, aminosilylated silicones, and silylated polyesters. These silane coupling agents may be used singly or in combination. Examples of the reaction product of a silane coupling agent include reaction products of isocyanatosilanes and hydroxy group-containing compounds or amino group-containing compounds; Michael addition products of aminosilanes; reaction products of aminosilanes and epoxy group-containing compounds; and reaction products of epoxysilanes and carboxylic acid-group containing compounds or amino group-containing compounds.

The amount of the silane coupling agent is preferably 0.1 to 20 parts by weight, and particularly preferably 0.5 to 10 parts by weight for each 100 parts by weight of the polymer (A).

Specific examples of the adhesion promoter other than silane coupling agents include, but are not limited to, epoxy resins, phenol resins, sulfur, alkyl titanates, and aromatic polyisocyanates. These adhesion promoters may be used singly, or two or more of these may be used in admixture. The adhesion promoter can be added to improve adhesion to adherends.

The composition of the present invention may contain a silicate. The silicate functions as a cross-linking agent and is capable of improving the recovery, durability, and creep resistance of the cured product formed from the curable composition of the present invention. The silicate also has the effects of improving adhesion, water-resistant adhesion, and the bond durability under high temperature and high humidity conditions. Examples of the silicate include tetraalkoxysilanes, alkylalkoxysilanes, and partially hydrolyzed condensates thereof.

Specific examples of the silicate include tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, and tetra-t-butoxysilane, and partially hydrolyzed condensates thereof.

Partially hydrolyzed condensates of tetraalkoxysilanes are more preferred because they are more effective in improving the recovery, durability, and creep resistance in the present invention than tetraalkoxysilanes.

Examples of the partially hydrolyzed condensates of tetraalkoxysilanes include those obtained by adding water to a tetraalkoxysilane and performing partial hydrolysis and condensation in a conventional manner. Commercially available partially hydrolyzed condensates of organosilicate compounds may be used. Examples of such condensates include Methyl Silicate 51 and Ethyl Silicate 40 (both from Colcoat Co., Ltd.).

If a silicate is used, the amount thereof is 0.1 to 20 parts by weight, preferably 0.5 to 10 parts by weight for each 100 parts by weight of the polymer (A).

The curable composition of the present invention may contain various fillers. Examples of the fillers include reinforcing fillers such as fumed silica, precipitated silica, crystalline silica, fused silica, dolomite, silicic anhydride, hydrous silicic acid, and carbon black; fillers such as ground calcium carbonate, colloidal calcium carbonate, magnesium carbonate, diatomite, calcined clay, clay, talc, titanium oxide, bentonite, organobentonite, ferric oxide, fine aluminum powder, flint powder, zinc oxide, activated zinc white, and resin powders such as PVC powder and PMMA powder; and fibrous fillers such as asbestos, glass fibers and filaments.

Such a filler may be previously dehydrated and dried by uniformly mixing the filler with a dehydrating agent such as calcium oxide, and then allowing the mixture to stand in a sealed bag made of an airtight material for an appropriate period of time, as disclosed in JP-A 2001-181532. The thus prepared filler with low moisture content can be used to improve storage stability particularly in the case that a one-pack composition is prepared.

Moreover, if a composition having high transparency is desired, a polymer powder made of a polymer such as poly (methyl methacrylate), non-crystalline silica or the like may be used as the filler, as disclosed in JP-A H11-302527. Moreover, hydrophobic silica, which is fine powder of silicon dioxide having hydrophobic groups bonded to the surface, or the like can be used as the filler to provide a highly transparent composition, as disclosed in JP-A 2000-38560. In general, the surface of silicon dioxide fine powder is provided with silanol (—SiOH) groups. The hydrophobic silica as used herein refers to a product obtained by reacting these silanol groups with an organosilicon halide, an alcohol or the like to form —SiO— hydrophobic groups. More specifically, the hydrophobic silica is obtained by reacting and bonding silanol groups present on the surface of silicon dioxide fine powder with dimethylsiloxane, hexamethyldisilazane, dimethyldichlorosilane, trimethoxyoctylsilane, trimethylsilane or the like. It is noted that silicon dioxide fine powder whose surface is provided with silanol (—SiOH) groups is called hydrophilic silica fine powder.

The filler used to provide the cured product with high strength is preferably selected mainly from fumed silica, precipitated silica, crystalline silica, fused silica, dolomite, silicic anhydride, hydrous silicic acid, carbon black, surface-treated finely divided calcium carbonate, calcined clay, clay, activated zinc white and the like. In this case, the amount of the filler is preferably 1 to 200 parts by weight for each 100 parts by weight of the polymer (A).

Moreover, if a cured product having low strength and great elongation at break is desired, desirable results can be obtained when a filler selected mainly from titanium oxide, calcium carbonate such as ground calcium carbonate, magnesium carbonate, talc, ferric oxide, zinc oxide, shirasu balloons, and the like is used in an amount ranging from 5 to 200 parts by weight for each 100 parts by weight of the polymer (A). In general, calcium carbonate with greater specific surface area is more effective in improving the tensile strength at break, elongation at break, and adhesion of cured products. When calcium carbonate is used, it is desirable to combine surface-treated finely divided calcium carbonate with calcium carbonate having a large particle size, such as ground calcium carbonate. The surface-treated finely divided calcium carbonate preferably has a particle size of 0.5 µm or smaller, and is preferably surface-treated with a fatty acid or a fatty acid salt. On the other hand, the large particle size calcium carbonate preferably has a particle size of 1 µm or larger, and may not be surface-treated. Examples of the surface treatment agent used to prepare surface-treated calcium carbonate power include, but are not limited to, fatty acids and unsaturated fatty acids, such as palmitic acid, caprylic acid, capric acid, lauric acid, stearic acid, arachidic acid, behenic acid, lignoceric acid, oleic acid, linoleic acid, and linolenic acid, and other carboxylic acids such as rosin acid compounds, as well as esters thereof, silane compounds such as hexamethyldisilazane, chloroisilanes, and aminosilanes, and paraffinic compounds. Among these, carboxylic acids are preferred as the surface treatment agent because they can further reduce curing retardation in curable silicone resin compositions. Further, among the carboxylic acids, saturated fatty acids and unsaturated fatty acids, which can still further reduce curing retardation, are particularly preferred. Of course, these fillers may be used singly, or two or more of these may be used in admixture. Colloidal calcium carbonate that is surface-treated with fatty acid and non-surface treated calcium carbonate having a particle size of 1 µm or larger (e.g., ground calcium carbonate), may also be used in combination.

The amount of the filler is preferably 1 to 300 parts by weight, and particularly preferably 10 to 200 parts by weight for each 100 parts by weight of the polymer (A).

It is preferred to add organic or inorganic balloons to improve workability (e.g. coating workability) of the composition and to provide a matte surface to the cured product. These fillers may be surface-treated. These fillers may be used alone, or two or more of these may be used in admixture. In order to improve workability (e.g. coating workability), the particle size of the balloon is preferably 0.1 mm or smaller. In order to provide a matte surface to the cured product, the particle size is preferably 5 to 300 µm.

Since, for example, the composition of the present invention gives a cured product with good chemical resistance, the composition can be suitably applied to adhesives for the joints of exterior walls of houses, such as siding boards, particularly ceramic siding boards, adhesives for exterior wall tiles, and adhesives for exterior wall tiles that are intended to be left alone in the joints, and the like. Here, it is desirable to match the design of a sealant with the exterior wall design. In particular, exterior walls with a luxurious feel created by sputter coating or by the addition of colored aggregates or the like are being used. When a scaly or particulate substance having a diameter of 0.1 mm or larger, preferably about 0.1 to 5.0 mm, is added into the composition of the present invention, the resulting composition has the advantages that the cured product can match up with such luxurious exterior walls and that the cured product shows excellent chemical resistance and thus can maintain the appearance for a long time. When a particulate substance is used, a sanded or sandstone-like coarse surface can be formed. When a scaly substance is used, an irregular surface resulting from its scaly shape can be formed.

As described in JP-A H09-53063, the preferred diameter, amount, material and other conditions of the scaly or particulate substance are as follows.

The diameter is 0.1 mm or larger, preferably about 0.1 to 5.0 mm, and may be appropriately selected according to the material, pattern, and other conditions of the exterior wall. Those with a diameter of about 0.2 to 5.0 mm or about 0.5 to 5.0 mm are also usable. In the case of using a scaly substance, the thickness of the substance should be about 1/10 to 1/5 of the diameter (i.e., about 0.01 to 1.00 mm). The scaly or particulate substance is previously mixed with a sealant base mixture to prepare a sealant before transportation to the work site, or is mixed with a sealant base mixture at the work site before use.

The scaly or particulate substance is added in an amount of about 1 to 200 parts by weight for each 100 parts by weight of the composition, e.g. for sealants or adhesives. The amount to be added is appropriately selected according to the particular size of the scaly or particulate substance, the material and pattern of the exterior wall, and the like.

Examples of the scaly or particulate substance include natural materials such as silica sand and mica, synthetic rubber, synthetic resin, and inorganic materials such as alumina. To improve the design quality of the joint filled with the composition, the scaly or particulate substance is colored a suitable color according to the material, pattern and other conditions of the exterior wall.

Preferred finishing methods and the like are described in JP-A H09-53063.

Moreover, if a balloon (preferably with an average particle size of 0.1 mm or larger) is used for the same purpose, a sanded or sandstone-like coarse surface can be formed and, at the same time, the weight can be reduced. The preferred diameter, amount, material and other conditions of the balloon are as described in JP-A H10-251618.

The balloon refers to a spherical filler having a hollow inside. The balloon can be added in order to reduce the weight (specific gravity) of the composition. Examples of the material of the balloon include, but are not limited to, inorganic materials such as glass, shirasu, and silica, and organic materials such as phenol resin, urea resin, polystyrene, and Saran. Further, an inorganic material and an organic material may be formed into a composite or may be layered to form a multilayer. Inorganic or organic balloons, or their composite balloons, or the like may be used. Also, a single type of balloon may be used, or a mixture of multiple types of balloons differing in material may be used. Moreover, the surface of the balloon may be processed or coated before use, or the surface may be treated with various surface treatment agents before use. For example, organic balloons coated with calcium carbonate, talc, titanium oxide or the like, inorganic balloons surface-treated with silane coupling agents, and the like may be used.

To obtain a sanded or sandstone-like coarse surface, the particle size of the balloon is preferably 0.1 mm or larger. Balloons having a particle size of about 0.2 to 5.0 mm or about 0.5 to 5.0 mm are also usable. Balloons with a particle size of smaller than 0.1 mm may not provide a coarse texture but only increase the viscosity of the composition even when they are added in a large amount. The amount of the balloon can be easily determined according to the coarseness of the desired sanded or sandstone-like texture. Generally, it is desirable to add a balloon having a particle size of 0.1 mm or larger to an extent that gives a volume concentration of 5 to 25% by volume of the composition. If the volume concentration of the balloon is lower than 5% by volume, no coarse texture tends to be obtained, while if the volume concentration exceeds 25% by volume, the resulting sealant or adhesive tends to have an increased viscosity and poor workability, and its cured product also tends to have increased modulus, resulting in deterioration of the basic sealant or adhesive properties. In terms of the balance with the basic sealant properties, the volume concentration is particularly preferably 8 to 22% by volume.

When a balloon is used, the following agents may be added: an anti-slip agent as described in JP-A 2000-154368, and an amidine compound for giving a matte appearance as well as an irregular appearance to the surface of the cured product, particularly a primary and/or secondary amine with a melting point of 35° C. or higher, as described in JP-A 2001-164237.

Specific examples of the balloon are described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, WO 97/05201, and the like.

Also, thermoexpandable hollow microspheres described in JP-A 2004-51701, JP-A 2004-66749 and the like may be used. The term "thermoexpandable hollow microsphere" means a plastic sphere obtained by spherically enclosing a low 0.15 boiling point compound, such as a C1 to C5 hydrocarbon, in a polymer shell (vinylidene chloride copolymer, acrylonitrile copolymer, or vinylidene chloride-acrylonitrile copolymer). When the portion bonded with such a composition is heated, the gas pressure inside the shell of the thermoexpandable hollow microsphere increases while the polymer shell material softens, which results in dramatic expansion of the volume. In this way, the thermoexpandable hollow microsphere serves to separate the adhesive interface. If the thermoexpandable hollow microsphere is added, a thermally peelable adhesive composition is obtained which, at the time of disposal, can be easily peeled, without breaking materials, just by heating using no organic solvent.

Also when the composition of the present invention contains particles of a cured sealant, the resulting cured product can be provided with a surface sufficiently irregular to improve the design. As described in JP-A 2001-115142, the preferred diameter, amount, material and other conditions of the particles of a cured sealant are as follows. The diameter is preferably 0.1 to 1 mm, and more preferably about 0.2 to 0.5 mm. The amount is preferably 5 to 100% by weight, and more preferably 20 to 50% by weight of the curable composition. The material may be a urethane resin, silicone, modified silicone, polysulfide rubber, or the like, and the material is not limited as long as it is usable in sealants. Modified silicone sealants are preferred.

The amount of the hollow sphere is preferably 0.01 to 30 parts by weight, and particularly preferably 0.1 to 20 parts by weight for each 100 parts by weight of the polymer (A). If the amount is less than 0.01 parts by weight, the hollow sphere has no effect in improving workability. If the amount is more than 30 parts by weight, the cured product tends to have reduced elongation and reduced tensile strength at break.

The curable composition of the present invention may optionally contain an anti-sagging agent to prevent sagging and improve workability. Moreover, examples of the anti-sagging agent include, but are not limited to, polyamide waxes; hydrogenated castor oil derivatives; and metal soaps such as calcium stearate, aluminum stearate, and barium stearate. Furthermore, rubber powder having a particle size of 10 to 500 μm such as those disclosed in JP-A H11-349916, or organic fibers such as those disclosed in JP-A 2003-155389 can be used to provide the composition with high thixotropy and good workability. These anti-sagging agents may be used singly or in combination of two or more.

The amount of the anti-sagging agent is preferably 0.1 to 20 parts by weight for each 100 parts by weight of the polymer (A).

The curable composition of the present invention may contain an antioxidant (age resister). The use of an antioxidant enhances weather resistance of the cured product. Examples of the antioxidant include hindered phenol antioxidants, monophenol antioxidants, bisphenol antioxidants, and polyphenol antioxidants. Particularly preferred are hindered phenol antioxidants. Similarly, the following hindered amine light stabilizers can be used: Tinuvin 622LD and Tinuvin 144; CHIMASSORB 944LD and CHIMASSORB 119FL (all available from Ciba Japan K.K.); Adekastab LA-57, Adekastab LA-62, Adekastab LA-67, Adekastab LA-63, and Adekastab LA-68 (all available from ADEKA CORPORATION); and SANOL LS-770, SANOL LS-765, SANOL LS-292, SANOL LS-2626, SANOL LS-1114, and SANOL LS-744 (all available from Sankyo Lifetech Co., Ltd.). Specific examples of the antioxidant are also disclosed in JP-A H04-283259 and JP-A H09-194731.

The amount of the antioxidant is preferably 0.1 to 10 parts by weight, and particularly preferably 0.2 to 5 parts by weight for each 100 parts by weight of the polymer (A).

The curable composition of the present invention may contain a light stabilizer. The use of a light stabilizer can prevent the cured product from photooxidative degradation. Examples of the light stabilizer include benzotriazole compounds, hindered amine compounds, and benzoate compounds. Particularly preferred are hindered amine compounds.

The amount of the light stabilizer is preferably 0.1 to 10 parts by weight, and particularly preferably 0.2 to 5 parts by weight for each 100 parts by weight of the polymer (A).

When the curable composition of the present invention contains a photo-curable substance, particularly an unsaturated acrylic compound, a tertiary amine-containing hindered amine light stabilizer is preferably used as the hindered amine light stabilizer to improve storage stability of the composition, as described in JP-A H05-70531. Examples of the tertiary amine-containing hindered amine light stabilizer include Tinuvin 622LD, Tinuvin 144, and CHIMASSORB 119FL (all available from Ciba Japan K.K.); Adekastab LA-57, LA-62, LA-67, and LA-63 (all available from ADEKA CORPORATION); and SANOL LS-765, LS-292, LS-2626, LS-1114, and LS-744 (all available from Sankyo Lifetech Co., Ltd.).

The curable composition of the present invention may contain an ultraviolet absorber. The use of an ultraviolet absorber enables an increase in the surface weather resistance of the cured product. Examples of the ultraviolet absorber include benzophenone compounds, benzotriazole compounds, salicylate compounds, substituted tolyl compounds, and metal chelate compounds. Particularly preferred are benzotriazole compounds, such as those under the trade names Tinuvin P, Tinuvin 213, Tinuvin 234, Tinuvin 326, Tinuvin 327, Tinuvin 328, Tinuvin 329 and Tinuvin 571 (all available from BASF). Particularly preferred are 2-(2H-1,2,3-benzotriazol-2-yl)-phenol compounds. Further, it is preferable to use a phenol or hindered phenol antioxidant, a hindered amine light stabilizer, and a benzotriazole ultraviolet absorber in combination.

The amount of the ultraviolet absorber is preferably 0.1 to 10 parts by weight, and particularly preferably 0.2 to 5 parts by weight for each 100 parts by weight of the polymer (A).

The curable composition of the present invention may optionally contain various additives for adjustment of the properties of the curable composition or cured product. Examples of the additives include flame retardants, curability modifiers, radical inhibitors, metal deactivators, antiozonants, phosphorus-containing peroxide decomposers, lubricants, pigments, blowing agents, solvents, and antifungal agents. These various additives may be used singly or in combination of two or more. Specific examples of the additives other than those mentioned herein are described in, for example, JP-B H04-69659, JP-B H07-108928, JP-A S63-254149, JP-A S64-22904, and JP-A 2001-72854.

The curable composition of the present invention can be prepared as a one-pack composition which is prepared by previously compounding all the formulation components and hermetically storing the mixture, and which is cured by moisture in the air after application. Alternatively, the curable composition can be prepared as a two-pack composition which includes separately a polymer composition and a curing agent mixture prepared by mixing a curing catalyst, filler, plasticizer, water, and other components, and in which the polymer composition and the mixture are mixed prior to use.

In the case that the curable composition is prepared as a one-pack composition, since all the formulation components are mixed in advance, it is preferred to dehydrate and dry water-containing formulation components prior to use or to dehydrate them, for example, under reduced pressure during the mixing and kneading. In the case that the curable composition is prepared as a two-pack composition, since a curing catalyst needs not be mixed in the base mixture including the reactive silyl group-containing polymers, gelation is less likely to occur even when a small amount of water remains in the formulation components; still, if long-term storage stability is required, the formulation components are preferably dehydrated and dried. Suitable methods for dehydration and drying are heat drying in the case of solids such as powder, and dehydration under reduced pressure or dehydration using synthetic zeolite, active alumina, silica gel or the like in the case of liquids. Alternatively, dehydration may be carried out by adding a small amount of an isocyanate compound to react water with the isocyanato group. Storage stability can be further improved by, in addition to performing the dehydration and drying method mentioned above, adding a lower alcohol, such as methanol or ethanol; or an alkoxysilane compound, such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane.

The amount of the dehydrating agent, particularly the silicon compound that can react with water, such as vinyltrimethoxysilane, is preferably 0.1 to 20 parts by weight, and particularly preferably 0.5 to 10 parts by weight for each 100 parts by weight of the polymer (A).

The curable composition of the present invention may optionally contain a physical property modifier to modify the tensile properties of the resulting cured product. Examples of the physical property modifier include, but are not limited to, alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilanes such as dimethyldiisopropenoxysilane, methyltriisopropenoxysilane, and γ-glycidoxypropylmethyldiisopropenoxysilane; trialkylsilyl borates such as tris(trimethylsilyl) borate and tris(triethylsilyl)borate; silicone varnishes; and polysiloxanes. The physical property modifier can be used to increase the hardness of the composition of the present invention after curing, or conversely reduce the hardness while enhancing elongation at break. The physical property modifiers may be used singly or in combination of two or more.

In particular, compounds that generate a compound containing a monovalent silanol group within the molecule by hydrolysis function to decrease the modulus of the cured product without deteriorating the stickiness condition on the surface of the cured product. Particularly preferred are compounds generating trimethylsilanol. Examples of the compounds that generate a compound containing a monovalent silanol group within the molecule by hydrolysis include compounds disclosed in JP-A H05-117521. Other examples include compounds forming silicon compounds that are derivatives of alkyl alcohols (e.g. hexanol, octanol, decanol), and generate $R_3SiOH$ (e.g. trimethylsilanol) by hydrolysis; and compounds forming silicon compounds that are derivatives of polyalcohols each having three or more hydroxy groups (e.g., trimethylolpropane, glycerol, pentaerythritol, sorbitol), and generate $R_3SiOH$ (e.g. trimethylsilanol) by hydrolysis, as disclosed in JP-A H11-241029.

Still other examples include compounds forming silicon compounds that are derivatives of oxypropylene polymers and generate $R_3SiOH$ (e.g. trimethylsilanol) by hydrolysis, as disclosed in JP-A H07-258534, as well as polyoxyalkylene polymers that contain a cross-linkable hydrolyzable silicon-containing group and a silicon-containing group capable of forming a monosilanol-containing compound by hydrolysis, as disclosed in JP-A H06-279693.

In the present invention, a tackifying resin may be added in order to increase tackiness or adhesion to substrates or according to other needs. The tackifying resin may be any of those generally used.

Specific examples include terpene resins, aromatic modified terpene resins, hydrogenated terpene resins prepared by hydrogenating these terpene resins; terpene-phenol resins prepared by copolymerizing terpenes with phenols; phenol resins, modified phenol resins, xylene-phenol resins, cyclopentadiene-phenol resins, coumarone-indene resins, rosin resins, rosin ester resins, hydrogenated rosin ester resins, xylene resins, low molecular weight polystyrene resins, styrene copolymer resins, petroleum resins (e.g. C5 hydrocarbon resin, C9 hydrocarbon resin, C5/C9 hydrocarbon copolymer resin), hydrogenated petroleum resins, and DCPD resins. These resins may be used singly or in combination or two or more.

Examples of the styrene block copolymers and hydrogenated products thereof include, but are not limited to, styrene-butadiene-styrene block copolymer (SBS), styrene-isoprene-styrene block copolymer (SIS), styrene-ethylene/butylene-styrene block copolymer (SEBS), styrene-ethylene/propylene-styrene block copolymer (SEPS), and styrene-isobutylene-styrene block copolymer (SIBS).

Preferred among these are terpene-phenol resins, which are highly compatible with the polymer (A) and can provide a high adhesion effect. If importance is placed on color tone, on the other hand, hydrocarbon resins are preferred.

The amount of the tackifying resin is preferably 2 to 100 parts by weight, more preferably 5 to 50 parts by weight, and still more preferably 5 to 30 parts for each 100 parts by weight of the polymer (A). If the amount is less than 2 parts by weight, the tackifying resin is less effective for tackiness or adhesion to substrates. Also, if the amount is more than 100 parts by weight, the curable composition may have an excessively high viscosity and be difficult to handle.

The composition of the present invention may contain a compound containing an epoxy group. The use of an epoxy group-containing compound enhances recovery of the cured product. Examples of the epoxy group-containing compound include epoxidized unsaturated fats and oils, epoxidized unsaturated fatty acid esters, alicyclic epoxy compounds, and epichlorohydrin derivatives, and mixtures thereof. Specific examples thereof include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. Particularly preferred among these is E-PS. The epoxy compound is preferably used in an amount ranging from 0.5 to 50 parts by weight for each 100 parts by weight of the polymer (A).

The composition of the present invention may contain a photo-curable substance. The use of a photo-curable substance results in the formation of a photo-curable substance layer on the surface of the cured product, which improves the properties of the cured product in terms of stickiness and weather resistance. The photo-curable substance refers to a substance that undergoes chemical changes in molecular structure such that changes in physical properties, such as curing, can be caused in a considerably short period of time by action of light. Such substances include many known compounds such as organic monomers, oligomers, and resins, and compositions containing any of them, and any commercially available ones can be used. Typical examples include unsaturated acrylic compounds, polyvinyl cinnamates, and azidized resins. Examples of the unsaturated acrylic compounds include monomers having a single or a plurality of acrylic or methacrylic unsaturated groups, oligomers thereof, and mixtures thereof. For example, monomers such as propylene (or butylene or ethylene) glycol di(meth)acrylate, and neopentyl glycol di(meth)acrylate, and their oligoesters with a molecular weight of 10,000 or lower may be mentioned. Specific examples include the special acrylates such as (difunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; and (polyfunctional) Aronix M-400. In particular, acrylic functional group-containing compounds are preferred, and compounds having 3 or more acrylic functional groups per molecule on average are also preferred (all Aronix products available from Toagosei Co., Ltd.).

Examples of the polyvinyl cinnamates include photosensitive resins with cinnamoyl groups functioning as photosensitive groups, such as those obtained by esterification of polyvinyl alcohol with cinnamic acid, as well as many derivatives of polyvinyl cinnamate. Azidized resins are known as photosensitive resins with azide groups functioning as photosensitive groups, and include photosensitive rubber solutions typically containing a diazide compound as a photosensitizer. Detailed examples of the resins are also described in "Kankosei Jushi (Photosensitive Resins)" (published on Mar. 17, 1972 by Insatsu Gakkai Shuppanbu Ltd., p. 93 ff., p. 106 ff., and p. 117 ff.). These may be used alone or in admixture with each other, optionally along with a sensitizer added thereto. In some cases, the addition of a sensitizer (e.g. ketones, nitro compounds) or an accelerator (e.g. amines) enhances the effect. The photo-curable substance is preferably used in an amount ranging from 0.1 to 20 parts by weight, more preferably 0.5 to 10 parts by weight for each 100 parts by weight of the polymer (A). An amount of 0.1 parts by weight or less tends not to provide the effect of enhancing weather resistance, while an amount of 20 parts by weight or more tends to make the resulting cured product so hard that cracking can be caused.

The composition of the present invention may contain an oxygen-curable substance. The oxygen-curable substances include unsaturated compounds that can react with oxygen in the air, and they function to, for example, prevent surface stickiness and the attachment of dirt or dust to the surface of the cured product by reacting with oxygen in the air to form a cured layer around the surface of the cured product. Specific examples of the oxygen-curable substance include drying oils such as tung oil and linseed oil, and various alkyd resins obtained by modification of these compounds; drying oil-modified acrylic polymers, epoxy resins, and silicone resins; liquid polymers such as 1,2-polybutadiene, 1,4-polybutadiene and polymers of C5-C8 dienes, which are obtainable by polymerizing or copolymerizing diene compounds (e.g. butadiene, chloroprene, isoprene, and 1,3-pentadiene), and liquid copolymers such as NBR and SBR, which are obtainable by copolymerizing the aforementioned diene compound and a monomer copolymerizable therewith (e.g., acrylonitrile, styrene) such that the diene compound serves as the main component, and various modified products thereof (e.g. maleate-modified products, boiled-oil-modified products). These may be used singly or in combination of two or more. Particularly preferred among these are tung oil and liquid diene polymers. Moreover, the combined use with a catalyst or metal dryer for promoting an oxidative curing reaction can enhance the effect in some cases. Examples of such catalysts and metal dryers include metal salts such as cobalt naphthenate, lead naphthenate, zirconium naphthenate, cobalt octylate, and zirconium octylate, and amidine compounds. The amount of the oxygen-curable substance used is preferably 0.1 to 2.0 parts by weight, and more preferably 0.5 to 10 parts by weight for each 100 parts by weight of the polymer (A). An amount less than 0.1 parts by weight tends to result in an insufficient improvement of stain resistance, while an amount more than 20 parts by weight tends to impair the properties such as tensile properties of the cured product. As described in JP-A H03-160053, the oxygen-curable substance is preferably used in combination with a photo-curable substance.

The composition of the present invention may contain an epoxy resin. The curable composition containing an epoxy resin is preferably used particularly as adhesives, especially adhesives for exterior wall tiles. Examples of the epoxy resin include, but are not limited to, epichlorohydrin-bisphenol A epoxy resins, epichlorohydrin-bisphenol F epoxy resins, flame retardant epoxy resins such as glycidyl ethers of tetrabromobisphenol A, novolak epoxy resins, hydrogenated bisphenol A epoxy resins, glycidyl ether epoxy resins derived from bisphenol A-propylene oxide adducts, p-oxybenzoic acid glycidyl ether ester epoxy resins, m-aminophenol epoxy resins, diaminodiphenylmethane epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ethers, glycidyl ethers of polyalcohols such as glycerol, hydantoin epoxy resins, petroleum resins and other epoxidized products of unsaturated polymers. Generally used epoxy resins may be used. Epoxy resins having at least two epoxy groups per molecule are preferred because they are highly reactive in curing and enable the cured product to easily form a three-dimensional network structure. More preferred are bisphenol A epoxy resins, novolak epoxy resins and the like. The epoxy resin is used at a ratio by weight of the polymer (A) to the epoxy resin ranging from 100/1 to 1/100. If the polymer (A)/epoxy resin ratio is less than 1/100, the effects of improving the impact strength and toughness of the cured product of epoxy resin are less likely to be produced. If the polymer (A)/epoxy resin ratio is more than 100/1, such a polymer cured product shows insufficient strength. The preferred ratio varies depending on the application of the curable resin composition, and the like. For example, in order to improve the properties such as impact resistance, flexibility, toughness, and peeling strength of the cured product of epoxy resin, the amount of the polymer (A) used is preferably 1 to 100 parts by weight, and more preferably 5 to 100 parts by weight for each 100 parts by weight of the epoxy resin. In order to improve strength of the cured product, on the other hand, the amount of the epoxy resin used is preferably 1 to 200 parts by weight, and more preferably 5 to 100 parts by weight for each 100 parts by weight of the polymer (A).

When the composition of the present invention contains an epoxy resin, the composition can of course further contain a curing agent for curing the epoxy resin. As the epoxy resin curing agent, any generally used epoxy resin curing agent can be used. Specific examples include, but are not limited to, primary or secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyethers; tertiary amines such as 2,4,6-tris(dimethylaminomethyl)phenol and tripropylamine, and salts of these tertiary amines; polyamide resins; imidazoles; dicyandiamides; boron trifluoride complex compounds; carboxylic anhydrides such as phthalic anhydride, hexahydrophthalic anhydride, tetrahydrophthalic anhydride, dodecenyl succinic anhydride, pyromellitic dianhydride, and chlorendic anhydride; alcohols; phenols; carboxylic acids; diketone complex compounds of aluminum or zirconium, and other compounds. Moreover, these curing agents may be used singly or in combination of two or more.

If an epoxy resin curing agent is used, the amount thereof ranges from 0.1 to 300 parts by weight for each 100 parts by weight of the epoxy resin.

The epoxy resin curing agent may be a ketimine. Ketimines are stable in the absence of water, but are decomposed into a primary amine and a ketone by water and the generated primary amine functions as a curing agent for curing epoxy resins at room temperature. The ketimine can be used to prepare a one-pack composition. Such ketimines can be formed by the condensation reaction between amidine compounds and carbonyl compounds.

The ketimine may be synthesized using known amidine and carbonyl compounds. Examples of the amidine compound include diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, and p,p'-biphenylenediamine; polyamines such as 1,2,3-triaminopropane, triaminobenzene, tris(2-aminoethyl)amine, and tetra(aminomethyl)methane; polyalkylenepolyamines such as diethylenetriamine, triethylenetriamine, and tetraethylenepentamine; polyoxyalkylene polyamines; aminosilanes such as γ-aminopropyltriethoxysilane, N-(β-aminoethyl)-γ-aminopropyltrimethoxysilane, and N-(β-aminoethyl)-γ-aminopropylmethyldimethoxysilane. Examples of the carbonyl compound include aldehydes such as acetaldehyde, propionaldehyde, n-butylaldehyde, isobutylaldehyde, diethylacetaldehyde, glyoxal, and benzaldehyde; cyclic ketones such as cyclopentanone, trimethylcyclopentanone, cyclohexanone, and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; and β-dicarbonyl compounds such as acetylacetone, methyl acetoacetate, ethyl acetoacetate, dimethyl malonate, diethyl malonate, methyl ethyl malonate, and dibenzoylmethane.

If an imino group exists in the ketimine, the imino group may be reacted with a compound, including styrene oxide; glycidyl ethers such as butyl glycidyl ether and allyl glycidyl ether; and glycidyl esters. These ketimines may be used singly or in combination of two or more. The amount of the ketimine is 1 to 100 parts by weight for each 100 parts by weight of the epoxy resin, although it depends on the types of epoxy resin and ketimine.

The curable composition of the present invention may contain a flame retardant such as phosphorus plasticizers such as ammonium polyphosphate and tricresyl phosphate, aluminum hydroxide, magnesium hydroxide, and thermoexpandable graphite. The flame retardants may be used singly or in combination of two or more.

The amount of the flame retardant is 5 to 200 parts by weight, preferably 10 to 100 parts by weight, for each 100 parts by weight of the polymer (A).

The curable composition of the present invention may optionally contain various additives for adjustment of the properties of the curable composition or cured product. Examples of such additives include curability modifiers, radical inhibitors, metal deactivators, antiozonants, phosphorus-containing peroxide decomposers, lubricants, pigments, blowing agents, and antifungal agents. These various additives may be used singly or in combination of two or more. Specific examples of the additives other than the ones mentioned herein are described in, for example, JP-B H04-69659, JP-B H07-108928, JP-A S63-254149, JP-A 564-22904, and JP-A 2001-72854.

The curable composition of the present invention can be prepared as a one-pack composition which is prepared by previously compounding all the formulation components and hermetically storing the mixture, and which is cured by moisture in the air after application. Alternatively, the curable composition can be prepared as a two-pack composition which includes separately a polyoxyalkylene polymer composition and a curing agent mixture prepared by mixing a curing catalyst, filler, plasticizer, water, and other components, and in which the polymer composition and the mixture are mixed prior to use. It is preferred in terms of workability to prepare a one-pack composition.

In the case that the curable composition is prepared as a one-pack composition, since all the formulation components are mixed in advance, it is preferred to dehydrate and dry water-containing formulation components prior to use or to dehydrate them, for example, under reduced pressure during the mixing and kneading. In the case that the curable composition is prepared as a two-pack composition, since a curing catalyst needs not be mixed in the base mixture including the reactive silyl group-containing polyoxyalkylene polymers, gelation is less likely to occur even when a small amount of water remains in the formulation components; still, if long-term storage stability is required, the formulation components are preferably dehydrated and dried. Suitable methods for dehydration and drying are heat drying in the case of solids such as powder, and dehydration under reduced pressure or dehydration using synthetic zeolite, active alumina, silica gel, quicklime, magnesium oxide or the like in the case of liquids. Alternatively, dehydration may be carried out by adding a small amount of an isocyanate compound to react water with the isocyanato group. Alternatively, dehydration may be carried out by adding an oxazolidine compound such as 3-ethyl-2-methyl-2-(3-methylbutyl)-1,3-oxazolidine to react with water. Storage stability can be further improved by, in addition to performing the dehydration and drying method mentioned above, adding a lower alcohol, such as methanol or ethanol; or an alkoxysilane compound, such as n-propyltrimethoxysilane, vinyltrimethoxysilane, vinylmethyldimethoxysilane, γ-mercaptopropylmethyldimethoxysilane, γ-mercaptopropylmethyldiethoxysilane or γ-glycidoxypropyltrimethoxysilane.

The amount of the dehydrating agent, particularly the silicon compound that can react with water, such as vinyltrimethoxysilane, is preferably 0.1 to 20 parts by weight, preferably 0.5 to 10 parts by weight, for each 100 parts by weight of the polymer (A).

The curable composition of the present invention may be prepared by any usual method, such as, but not limited to, by mixing and kneading the aforementioned components at room temperature or under heat by a mixer, roller, kneader, or the like; and by dissolving the components in a small amount of an appropriate solvent and mixing them.

The curable composition of the present invention can be used in applications such as pressure-sensitive adhesives; sealants for buildings, ships, automobiles, roads, and the like; adhesives; impression materials; vibration-proof materials; damping materials; soundproof materials; expanded/foamed materials; coating materials; and spray coatings. Since the cured product obtained by curing the curable composition of the present invention is excellent in flexibility and adhesion, the curable composition is more preferably used as sealants or adhesives among these applications. The curable composition is particularly preferably used in adhesives that require rapid curability.

The curable composition of the present invention can also be used in various applications, including: electric and electronic part materials (e.g. solar cell backside sealants); electrical insulating materials (e.g. insulating coating materials for electric wires and cables); elastic adhesives; contact adhesives; spray sealants; crack repair materials; tile adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated glass edges (cut end faces); and liquid sealants for use in automotive parts, electrical machinery parts, various machinery parts, and the like. Furthermore, the curable composition can also be used as various hermetically sealing compositions and adhesive compositions because it, either alone or with the aid of a primer, may adhere tightly to a wide range of substrates such as glass, ceramics, wood, metals, and resin moldings. In addition, the curable composition of the present invention can also be used as adhesives for interior panels, adhesives for exterior panels, tile adhesives, stone pitching adhesives, ceiling finishing adhesives, floor finishing adhesives, wall finishing adhesives, vehicle panel adhesives, adhesives for electric/electronic/precision device assembling, direct glazing sealants, double glazing sealants, sealants for SSG systems, and sealants for working joints in buildings.

EXAMPLES

The present invention is described in more detail below using specific examples. The present invention is not limited the examples below.

Synthesis Example 1

To polyoxypropylene triol having a number average molecular weight (end group-based molecular weight defined above) of about 2,900 was added 1.2 equivalents of NaOMe in methanol. Then, methanol was removed and 1.5 equivalents of 3-chloro-1-propene was further added to convert the terminal hydroxy group to an allyl group. Thereafter, 36 ppm of platinum divinyldisiloxane complex (a 3% by weight (calculated as platinum) isopropanol solution) was added to 100 parts by weight of the resulting allyl group-terminated polyoxypropylene, and 12.59 parts by weight of triethoxysilane was slowly added dropwise with stirring. The mixed solution was allowed to react at 90° C. for 2 hours. Further, 110 parts by weight of methanol and 36 ppm of HCl were added to the mixture to convert the terminal ethoxy group to a methoxy group. This was followed by removal of excess methanol to give a branched reactive silyl group-containing polyoxypropylene polymer (a1-1) terminated with a trimethoxysilyl group, having a reactive silyl group equivalent of 0.80 mmol/g and a number average molecular weight of 2,900.

Synthesis Example 2

To polypropylene glycol having a number average molecular weight of about 2,900 (calculated in the same manner as in Synthesis Example 1) was added 1.2 equivalents of NaOMe in methanol per hydroxy group of the polypropylene glycol. Then, methanol was removed, and 1.5 equivalents of 3-chloro-1-propene was further added to convert the terminal hydroxy group to an allyl group. Thereafter, 36 ppm of platinum divinyldisiloxane complex (a 3% by weight (calculated as platinum) isopropanol solution) was added to 100 parts by weight of the resulting allyl group-terminated polyoxypropylene, and 10.17 parts by weight of triethoxysilane was slowly added dropwise with stirring. The mixed solution was allowed to react at 90° C. for 2 hours. Further, 90 parts by weight of methanol and 36 ppm of HCl were added to the mixture to covert the terminal ethoxy group to a methoxy group. This was followed by removal of excess methanol to give a linear reactive silyl group-containing polyoxypropylene polymer (a1-2) terminated with a trimethoxysilyl group, having a reactive silyl group equivalent of 0.62 mmol/g and a number average molecular weight of 2,900.

Synthesis Example 3

Propylene oxide was polymerized using polyoxypropylene triol with a molecular weight of about 3,000 as an initiator and a zinc hexacyanocobaltate glyme complex catalyst to produce a hydroxy group-terminated polyoxypropylene having a number average molecular weight of 12,000 (calculated in the same manner as in Synthesis Example 1). To the hydroxy group-terminated polyoxypropylene was added 1.2 equivalents of NaOMe in methanol per hydroxy group of the polyoxypropylene. Then, methanol was removed, and 1.5 equivalents of 3-chloro-1-propene was further added to convert the terminal hydroxy group into an allyl group. Thereafter, 36 ppm of platinum divinyldisiloxane complex (a 3% by weight (calculated as platinum) isopropyl alcohol solution) was added to 100 parts by weight of the resulting allyl group-terminated polyoxypropylene polymer, and 3.31 parts by weight of triethoxysilane was slowly added dropwise with stirring. The mixed solution was allowed to react at 90° C. for 2 hours. Further, 30 parts by weight of methanol and 12 ppm of HCl were added to the mixture to covert the terminal ethoxy group to a methoxy group. This was followed by removal of excess methanol to give a branched reactive silyl group-containing polyoxypropylene polymer (a1-3) terminated with a trimethoxysilyl group, having a reactive silyl group equivalent of 0.20 mmol/g and a number average molecular weight of 12,000.

Synthesis Example 4

Propylene oxide was polymerized using polyoxypropylene diol with a molecular weight of about 2,000 as an initiator and a zinc hexacyanocobaltate glyme complex catalyst to produce a hydroxy group-terminated polyoxypropylene having a number average molecular weight of 10,000 (calculated in the same manner as in Synthesis Example 1). To the hydroxy group-terminated polyoxypropylene was added 1.2 equivalents of NaOMe in methanol per hydroxy group of the polyoxypropylene. Then, methanol was removed, and 1.5 equivalents of 3-chloro-1-propene was further added to convert the terminal hydroxy group to an allyl group. Thereafter, 36 ppm of platinum divinyldisiloxane complex (a 3% by weight (calculated as platinum) isopropyl alcohol solution) was added to 100 parts by weight of the resulting allyl group-terminated polyoxypropylene polymer, and 2.80 parts by weight of triethoxysilane was slowly added dropwise with stirring. The mixed solution was allowed to react at 90° C. for 2 hours. Further, 20 parts by weight of methanol and 12 ppm of HCl were added to the mixture to covert the terminal ethoxy group to a methoxy group. This was followed by removal of excess methanol to give a linear reactive silyl group-containing polyoxypropylene polymer (a1-4) terminated with a trimethoxysilyl group, having a reactive silyl group equivalent of 0.17 mmol/g and a number average molecular weight of 10,000.

Synthesis Example 5

Propylene oxide was polymerized using polyoxypropylene triol with a molecular weight of about 3,000 as an initiator and a zinc hexacyanocobaltate glyme complex catalyst to produce a hydroxy group-terminated polyoxypropylene having a number average molecular weight of 19,000 (calculated in the same manner as in Synthesis Example 1). To the hydroxy group-terminated polyoxypropylene was added 1.2 equivalents of NaOMe in methanol per hydroxy group of the polyoxypropylene. Then, methanol was removed, and 1.5 equivalents of 3-chloro-1-propene was further added to convert the terminal hydroxy group to an allyl group. Thereafter, 36 ppm of platinum divinyldisiloxane complex (a 3% by weight (calculated as platinum) isopropyl alcohol solution) was added to 100 parts by weight of the resulting allyl group-terminated polyoxypropylene polymer, and 1.69 parts by weight of triethoxysilane was slowly added dropwise with stirring. The mixed solution was allowed to react at 90° C. for 2 hours. Further, 30 parts by weight of methanol and 12 ppm of HCl were added to the mixture to covert the terminal ethoxy group to a methoxy group. This was followed by removal of excess methanol to give a branched reactive silyl group-containing polyoxypropylene polymer (a2-1) terminated with a trimethoxysilyl group, having a reactive silyl group equivalent of 0.10 mmol/g and a number average molecular weight of 19,000.

Example 1

The polymer (a1) obtained in Synthesis Example 1 and the polymer (a2) in a combined amount of 100 parts by weight were mixed with 160 parts by weight of ground calcium carbonate (Shiraishi Calcium Kaisha, Ltd., trade name: Whiton S B Red), 50 parts by weight of precipitated calcium carbonate treated with fatty acid (Shiraishi Kogyo Kaisha Ltd., trade name: Hakuenka CCR), 30 parts by weight of a plasticizer (BASF, trade name: Hexamoll DINCH), 3 parts by weight of an anti-sagging agent (Kusumoto Chemicals Ltd., trade name: Disparlon #6500), 1 part by weight of an ultraviolet absorber (Sumitomo Chemical Co., Ltd., trade name: Sumisorb 400), and 1 part by weight of a light stabilizer (Sankyo Lifetech Co., Ltd., trade name: Sanol LS770). The mixture was sufficiently kneaded and then passed through a three-roll paint mill three times so that the components were dispersed. Subsequently, the mixture was dehydrated under reduced pressure for 2 hours at 120° C., and then cooled to 50° C. or lower. To the mixture was added 4 parts by weight of vinyltrimethoxysilane (Momentive Performance Materials Inc., trade name: A-171) as a dehydrating agent. The resulting mixture was kneaded and then packed in a moisture-proof cartridge container.

The mixture was extruded from the cartridge in an atmosphere at a temperature of 23° C. and a relative humidity of 50%. To the extruded mixture were added 3 parts by weight of 3-aminopropyltrimethoxysilane (Momentive Performance Materials Inc., trade name: A-1110) and 0.3 parts by weight of dioctyltin bis(triethoxysilicate) (Nitto Kasei Co., Ltd., trade name: Neostann S-1) per 100 parts by weight in total of the polymers (a1) and (a2) in the mixture, followed by sufficient mixing to prepare a curable composition.

(Evaluation)

The skin formation time and the tensile shear strength of the prepared composition were determined by the methods below.

(Skin Formation Time)

The curable composition was charged into a mold having a thickness of about 5 mm with a spatula, and the surface of the composition was flattened. The time point at which the surface was flattened was defined as the curing start time. The surface of the composition was touched by a spatula from time to time, and the time period required for the composition to no longer stick to the spatula was determined and used as a skin formation time. The results of cure time are shown in Table 1.

(Tensile Shear Strength)

The change in adhesive strength over time of the curable composition was measured using aluminum adherends (adhesion area: 25 mm×25 mm). The curable composition was applied to the adherends, and then the adherends were attached to each other after an open time of 2 minutes. The time point at which the adherends were attached was defined as the start time. Tensile shear adhesive strength was measured (at a testing rate of 50 ram/min) and the failure mode was observed at 30 minutes and 1 hour from the start time and after curing for 3 days at 23° C. and a relative humidity of 50% and then for 4 days at 50° C. The failure mode was visually evaluated as follows: cohesive failure (failure within the adhesive layer)=CF; and interfacial failure (delamination at the interface between the adhesive and the adherend)=AF. The results are shown in Table 1.

Examples 2 to 4, Comparative Examples 1 to 6

The evaluation was carried out in the same manner as in Example 1, except that the polymers (a1) and (a2) were used in the proportions listed in Table 1.

TABLE 1

| Composition (parts by weight) | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Polymer (a1) | (a1-1) | 70 | 50 | | | 100 | | | | | 70 |
| | (a1-2) | | | 70 | | | 100 | | | | |
| | (a1-2) | | | | 70 | | | 100 | | | |
| | (a1-4) | | | | | | | | | 100 | 30 |
| Polymer (a2) | (a2-1) | 30 | 50 | 30 | 30 | | | | | 100 | |
| Calcium carbonate | Whiton SB Red[1] | 160 | 160 | 160 | 160 | 160 | 160 | 160 | 160 | 160 | 160 |
| | Hakuenka CCR[2] | 50 | 50 | 50 | 50 | 50 | 50 | 50 | 50 | 50 | 50 |
| Plasticizer | Hexamoll DINCH[3] | 30 | 30 | 30 | 30 | 30 | 30 | 30 | 30 | 30 | 30 |
| Thixotropic agent | Disparlon #6500[4] | 3 | 3 | 3 | 3 | 3 | 3 | 3 | 3 | 3 | 3 |
| Ultraviolet absorber | Sumisorb 400[5] | 1 | 1 | 1 | 1 | 1 | 1 | 1 | 1 | 1 | 1 |
| Light stabilizer | Sanol LS770[6] | 1 | 1 | 1 | 1 | 1 | 1 | 1 | 1 | 1 | 1 |
| Dehydrating agent | A-171[7] | 4 | 4 | 4 | 4 | 4 | 4 | 4 | 4 | 4 | 4 |
| Adhesion promoter | A-1110[8] | 3 | 3 | 3 | 3 | 3 | 3 | 3 | 3 | 3 | 3 |
| Catalyst | Neostann S-1[9] | 0.3 | 0.3 | 0.3 | 0.3 | 0.3 | 0.3 | 0.3 | 0.3 | 0.3 | 0.3 |
| Curability | Skin formation time | 10 min | 10 min | 15 min | 5 min | 20 min | 25 min | 15 min | 15 min | 15 min | 15 min |
| Tensile shear strength (MPa) | 30 minutes later | 0.8 (CF) | 0.5 (CF) | 0.3 (AF) | 1.5 (CF) | 0.2 (AF) | 0.02 (uncured) | 0.3 (AF) | 0.2 (AF) | 0.1 (AF) | 0.2 (AF) |
| Open time: 2 minutes | 1 hour later | 1.0 (CF) | 1.5 (CF) | 1.0 (CF) | 2.0 (CF) | 0.7 (CF) | 0.4 (AF) | 0.9 (AF) | 0.4 (AF) | 0.5 (AF) | 0.8 (CF) |
| Substrate: aluminum | 23° C. for 3 days + 50° C. for 4 days | 3.0 (CF) | 2.5 (CF) | 2.5 (CF) | 3.0 (CF) | 3.0 (CF) | 3.0 (CF) | 3.0 (CF) | 3.0 (CF) | 2.3 (CF) | 3.0 (CF) |

[1]Ground calcium carbonate (Shiraishi Calcium Kaisha, Ltd.)
[2]Precipitated calcium carbonate treated with fatty acid (Shiraishi Kogyo Kaisha Ltd.)
[3]1,2-Cyclohexane dicarboxylic acid diisononyl ester (BASF)
[4]Fatty acid amide wax (Kusumoto Chemicals Ltd.)
[5]2,4-Di-tert-butylphenyl-3,5-di-tert-butyl-4-hydroxybenzoate (Sumitomo Chemical Co., Ltd.)
[6]Bis(2,2,6,6,-tetramethyl-4-piperidyl)sebacate (Sankyo Lifetech Co., Ltd)
[7]Vinyltrimethoxysilane (Momentive Performance Materials Inc.)
[8]3-Aminopropyltrimethoxysilane (Momentive Performance Materials Inc.)
[9]Dioctyltin bis(triethoxy silicate) (Nitto Kasei Co., Ltd.)

Comparison between the examples and the comparative examples in Table 1 shows that the curable compositions containing the polymer (a1) and the polymer (a2) rapidly cured and had excellent initial adhesive strength. Such effects were significant especially when the polymers (a1-1), (a1-3) and (a2-1), which had a branched structure, were used (Examples 1 and 2, Example 4).

INDUSTRIAL APPLICABILITY

The curable composition of the present invention can be used in applications such as pressure-sensitive adhesives; sealants for buildings, ships, automobiles, roads, and the like; adhesives; impression materials; vibration-proof materials; damping materials; soundproof materials; expanded/foamed materials; coating materials; and spray coatings. Since the cured product obtained by curing the curable composition of the present invention is excellent in flexibility and adhesion, it is more preferable to use the curable composition as sealants or adhesives among these applications. It is particularly preferable to use the curable composition in adhesives that require rapid curability.

The curable composition of the present invention can also be used in various applications, including: electric and electronic part materials (e.g. solar cell backside sealants); electrical insulating materials such as insulating coating materials for electric wires and cables; elastic adhesives; contact adhesives; spray sealants; crack repair materials; tile adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated glass edges (cut end faces); and liquid sealants for use in automotive parts, electrical machinery parts, various machinery parts, and the like. Furthermore, the curable composition can also be used as various hermetically sealing compositions and adhesive compositions as it, either alone or with the aid of a primer, can adhere tightly to a wide range of substrates such as glass, ceramics, wood, metals, and resin moldings. In addition, the curable composition of the present invention can also be used as adhesives for interior panels, adhesives for exterior panels, tile adhesives, stone pitching adhesives, ceiling finishing adhesives, floor finishing adhesives, wall finishing adhesives, vehicle panel adhesives, adhesives for electric/electronic/precision device assembling, direct glazing sealants, double glazing sealants, sealants for SSG systems, and sealants for working joints in buildings.

The invention claimed is:

1. A curable composition, comprising
a polyoxyalkylene polymer (A) containing a reactive silyl group represented by Formula (1):

$$-SiR^1_a X_{3-a} \quad (1)$$

wherein $R^1$ represents a substituted or unsubstituted C1 to C20 hydrocarbon group; X represents a hydroxy group or a hydrolyzable group; a represents 0 or 1; and $R^1$s or Xs may be the same as or different from each other,
the polyoxyalkylene polymer (A) comprising:
a polyoxyalkylene polymer (a1) having a reactive silyl group equivalent of 0.15 mmol/g to 1.5 mmol/g, and
a polyoxyalkylene polymer (a2) having a reactive silyl group equivalent of 0.010 to 0.14 mmol/g,
wherein the polymer (a2) has a backbone with at least one branch.

2. The curable composition according to claim 1,
wherein the reactive silyl group of Formula (1) is a trimethoxysilyl group.

3. The curable composition according to claim 1,
wherein the polymer (a1) and the polymer (a2) contain the same reactive silyl group.

4. The curable composition according to claim 1,
wherein the polymer (a1) has a reactive silyl group equivalent of 0.20 mmol/g to 1.0 mmol/g.

5. The curable composition according to claim 1,
wherein the polymer (a2) has a reactive silyl group equivalent of 0.050 mmol/g to 0.14 mmol/g.

6. The curable composition according to claim 1,
wherein the polymer (a1) has a backbone with at least one branch.

7. The curable composition according to claim 1,
wherein the polymer (a1) has 1.6 or more reactive silyl groups of Formula (1) on average.

8. The curable composition according to claim 1,
wherein the polymer (a1) and the polymer (a2) are mixed at a ratio of (a1):(a2)=95:5 to 50:50 in parts by weight.

9. An adhesive, comprising the curable composition according to claim 1.

10. A sealant, comprising the curable composition according to claim 1.

11. A cured product, obtained by curing the curable composition according to claim 1.

12. The curable composition according to claim 1,
wherein the polymer (a1) and the polymer (a2) are mixed at a ratio of (a1):(a2)=90:10 to 60:40 (parts by weight).

13. The curable composition according to claim 1,
wherein the polymer (a1) and the polymer (a2) are mixed at a ratio of (a1):(a2)=85:15 to 70:30 (parts by weight).

* * * * *